United States Patent [19]
Årlin

[11] Patent Number: 5,726,608
[45] Date of Patent: Mar. 10, 1998

[54] TRIMMABLE MULTI-TERMINAL CAPACITOR FOR A VOLTAGE CONTROLLED OSCILLATOR

[75] Inventor: Michael Årlin, Stockholm, Sweden

[73] Assignee: Telefonaktiebolaget LM Ericsson, Stockholm, Sweden

[21] Appl. No.: 544,203

[22] Filed: Oct. 17, 1995

[51] Int. Cl.⁶ .............................. H01G 4/255; H03H 9/17
[52] U.S. Cl. ........................ 331/117 D; 331/117 R; 331/107 DP; 331/96; 333/2.35; 333/24 C; 361/328; 361/330
[58] Field of Search ........................ 361/328, 329, 361/330; 331/117 R, 96, 107 DP, 117 D; 333/24 C, 235

[56] References Cited

U.S. PATENT DOCUMENTS

| | | | |
|---|---|---|---|
| 4,054,853 | 10/1977 | Tarr et al. | 334/15 |
| 4,439,814 | 3/1984 | Rhodes | 361/321 |
| 4,476,518 | 10/1984 | Tsukahara | 361/328 |
| 4,709,409 | 11/1987 | Ma et al. | 455/325 |
| 4,728,909 | 3/1988 | Rudelle | 332/30 |
| 4,890,074 | 12/1989 | Ondria | 331/107 |
| 4,905,358 | 3/1990 | Einbinder | 29/25.42 |
| 4,906,947 | 3/1990 | Hart et al. | 331/107 |
| 4,951,006 | 8/1990 | Cohen | 331/74 |
| 5,166,646 | 11/1992 | Avanic et al. | 331/107 |
| 5,187,451 | 2/1993 | Nakamoto et al. | 331/99 |
| 5,264,983 | 11/1993 | Petrinec | 361/227 |
| 5,373,262 | 12/1994 | Yamamoto et al. | 331/96 |
| 5,422,782 | 6/1995 | Hernandez et al. | 361/329 XS |

FOREIGN PATENT DOCUMENTS

| | | |
|---|---|---|
| A-03-050809 | 3/1991 | Japan . |
| A-05 114804 | 5/1993 | Japan . |
| A-05 191201 | 7/1993 | Japan . |
| A-06 310369 | 11/1994 | Japan . |

Primary Examiner—Robert Pascal
Assistant Examiner—Arnold Kinkead
Attorney, Agent, or Firm—Jenkens & Gilchrist, P.C.

[57] ABSTRACT

The invention provides a trimmable multi-terminal capacitor. The multi-terminal capacitor comprises a plurality of capacitors with each of the capacitors having a common terminal. The capacitors are formed on a layer of dielectric material having a common plate of conductive material disposed on its top surface, and a plurality of separate plates of conductive material disposed on its lower surface. The capacitance value of each of the capacitors is separately tunable to tight tolerances. The capacitor is particularly suited to be used in a voltage controlled oscillator (VCO) to couple a plurality of devices to a resonator.

6 Claims, 1 Drawing Sheet

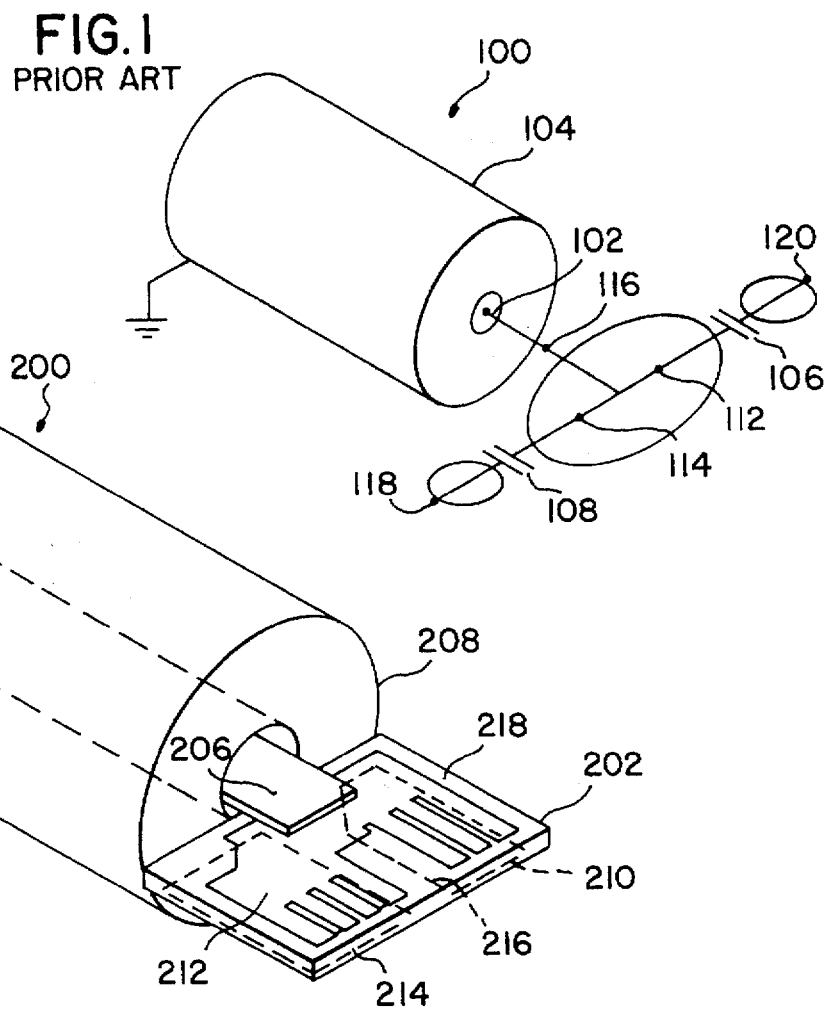
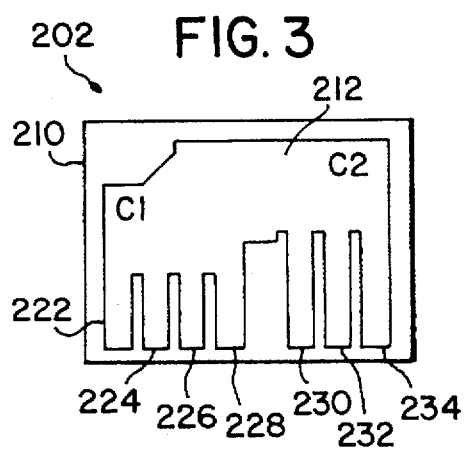
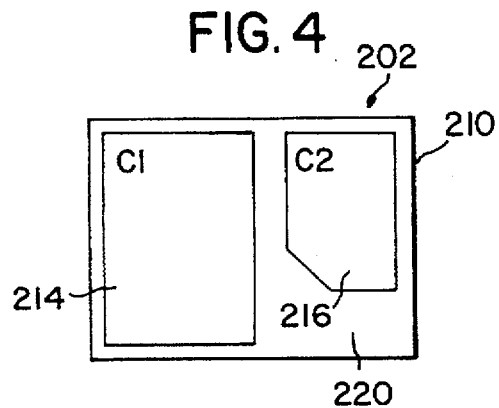

TRIMMABLE MULTI-TERMINAL CAPACITOR FOR A VOLTAGE CONTROLLED OSCILLATOR

BACKGROUND OF THE INVENTION

1. Field of the Invention

This invention relates to capacitors and, more particularly, to a trimmable multi-terminal capacitor for use with a voltage controlled oscillator (VCO).

2. History of the Prior Art

Progress in electronics technology has resulted in increasingly smaller electronic devices capable of performing increasingly sophisticated functions. One area in which this progress has been evident is the telecommunication area. Miniaturization in telecommunications electronics has allowed systems designers to design sophisticated systems using smaller and lighter equipment. The results of this are seen in the worldwide proliferation of cellular and related telecommunications systems.

Electronic circuitry used in modern day equipment often requires accurate, small capacitance values. An example of this type of circuitry is a voltage controlled oscillator (VCO). VCOs are used to generate radio frequency (RF) signals for transmitters and receivers in telecommunications equipment. A VCO typically comprises a VCO module, that includes a resonator and coupling capacitors as part of the module. In a VCO two or more discrete coupling capacitors are needed to couple an output terminal of the resonator to other components in the circuit. Typically the resonator would be coupled to a varactor diode and transistor, with the varactor diode and transistor being connected to other components of the circuit.

During the manufacture of a VCO module it is necessary to tune the oscillating circuit to the right operating conditions. In order to tune the module, the capacitance values of the coupling capacitors must be adjusted. With discrete capacitors this is a difficult process. Before the circuit is assembled the capacitors must be carefully measured and selected. At the small values used in typical VCO applications, which may be less than 1 pF, the capacitors may have a tolerance value of up to ±0.1 pF. If a capacitor of 0.2 pF is needed, this level of tolerance allows the value of the capacitor to be from 0.1 to 0.3 pF. A tolerance of this level is a ±50% deviation that could critically affect circuit performance. Additionally, the two discrete capacitors are not only purely capacitive, but have a more complex effect in a circuit.

FIG. 1 illustrates the conventional technique for connecting a resonator 104 in a voltage controlled oscillator (VCO) circuit 100. Output terminal 102 of resonator 104 is connected to capacitors 106 and 108 at points 112, 114 and 116. A varactor diode and transistor (not shown) for the oscillator circuit 100 are connected to capacitors 106 and 108 at points 120 and 118, respectively. The two discrete capacitors 106 and 108 require two soldering points each for connection to the circuit 100. These soldering points introduce stray inductances and resistive losses into the circuit. Also, the capacitances have a complex component model including stray inductances and some resistive losses in the device packaging that adds further losses in the circuit. This results in a deteriorated Q value for the coupling of the resonator to the circuit. Q is defined as $1/(2\pi f_c C R_s)$ where $f_c$ is the operating frequency of the circuit, C is the capacitance of the capacitor, and $R_s$ is the equivalent series resistance of the capacitor. A low Q value may cause undesirable losses within the circuit and effect the signal to noise performance of the VCO at high frequencies. The effect is more pronounced at frequencies above 1 GHZ. Also, when discrete capacitors are used, there is transmission phase deviation caused by the longer signal paths resulting from using two separate capacitors.

Because of the above, once the capacitors 106 and 108 are measured, selected and soldered into circuit 100, the actual in-circuit capacitance value may not be acceptable for the particular application. In order to tune the VCO 100 of FIG. 1 for optimum performance within a specified frequency band, the oscillator parameters must be tuned after assembly. The VCO may be tuned by hand scratching material away from resonator 104 or by changing the values of capacitors 106 and 108. Scratching material away from resonator 104 shifts the operating frequency range of the VCO up or down depending on where the material is removed from. Changing the value of capacitor 106 has the effect of both shifting the operating frequencies up and down and, widening or narrowing the band of operable frequencies, depending on whether the change in capacitance is an increase or decrease. Changing the value of capacitor 108 has the effect of lowering the Q value or, changing the oscillation properties of the VCO, depending on whether the change in capacitance is an increase or decrease.

The value of capacitor 106 determines the capacitive coupling of the varactor to the resonator 104. Increasing the value of capacitance for capacitor 106 increases the total capacitive coupling of the varactor to the resonator 104. A higher total capacitive coupling for the varactor decreases the value of the operating frequencies and increases the width of the frequency band within which the VCO may be tuned. Decreasing the value of capacitance for capacitor 106 decreases the total capacitive coupling of the varactor to the resonator 104. A lower total capacitive coupling for the varactor increases the value of the operating frequencies and decreases the width of the frequency band within which the VCO may be tuned.

The capacitor 108 determines the capacitive coupling of the resonance circuit to the resonator transistor and, therefore, the Q value of the resonance circuit. Increasing the value of capacitance for capacitor 108 results in a lower Q value for the circuit and, therefore, a lower signal to noise ratio (C/N). Decreasing the value of capacitance for capacitor 108 decreases the capacitive coupling of the resonance circuit to the transistor. If the capacitive coupling is too low, the VCO may not oscillate because of low feedback to the resonator transistor.

Because of the above, when tuning the VCO it may be necessary to change the values of capacitors 106 and 108 to adjust the width of the frequency band within which the VCO operates or tune the Q value of the circuit. The replacement of capacitors such as capacitors 106 and 108 is a time consuming and difficult. Also, it would be difficult to determine the effect of a replacement capacitor of a different value. Since the replacement capacitor would require new soldering, which replaces the stray inductances and resistive losses of the existing capacitor with the stray inductances and resistive losses of the replacement capacitor, the in circuit capacitance value of the replacement capacitor could vary considerably from its predicted value.

It would provide an advantage then to have capacitors with small capacitance values of fine design tolerances, with the capacitance values being tunable at high RF frequencies. It would provide a further advantage if these capacitors were easily and accurately tunable while in the circuit and could be used with a minimum number of soldering points and minimum lead length, thereby providing a higher Q value and lower phase deviation. Additionally, it would be advantageous if the capacitors were relatively easy to manufacture and package.

SUMMARY OF THE INVENTION

The present invention provides a trimmable multi-terminal capacitor for use in radio frequency (RF) circuits. The multi-terminal capacitor provides a plurality of capacitors of small capacitance values while avoiding the problems associated with using discrete capacitors. The capacitors are easily tunable while in the circuit, after circuit assembly, and may be tuned to the fine tolerances required for RF applications. Since the capacitors may be manufactured to be tunable within a specific range for a certain application, the range may be set wide enough so that it is not necessary to replace the capacitors to tune a circuit. Use of the multi-terminal capacitor requires a minimum number of soldering points and reduces lead lengths, resulting in a higher Q value and less losses within the circuit.

The multi-terminal capacitor comprises a plurality of capacitors, with one terminal of each capacitor being in common. The capacitors are formed on a layer of dielectric material having a common plate of conductive material disposed on its top surface, and a plurality of separate plates of conductive material disposed on its lower surface. The separate plates of conducting material on the lower surface of the dielectric material do not contact each other. The common plate of conducting material forms a common terminal of the capacitors. The separate plates each form the remaining terminal of one of the capacitors.

The capacitance value of each of the capacitances is separately tunable to tight tolerances. The tuning is done by removing material from the portion of the common conducting plate that directly opposes the separate plates, across the dielectric layer, of the capacitors it is desired to tune. The common conducting plate includes calibrated trimming tabs that may be removed for the purpose of tuning.

The capacitor may be used in a voltage controlled oscillator(VCO) to couple a plurality of devices to a resonator. The coupling is accomplished by connecting the common terminal of the multi-terminal capacitor to the resonator terminal and, the remaining terminal of each capacitor to one of the devices. The terminal of one capacitor is connected to the VCO transistor and the terminal of the Other capacitor is connected to the VCO varactor.

BRIEF DESCRIPTION OF THE DRAWINGS

FIG. 1 illustrates a conventional technique for connecting a resonator to a voltage controlled oscillator circuit;

FIG. 2 illustrates the use of a trimmable multi-terminal capacitor according to the invention to couple a resonator to a voltage controlled oscillator circuit;

FIG. 3 illustrates a top view of a trimmable multi-terminal. capacitor in accordance with the present invention; and FIG. 4 illustrates a bottom view of a trimmable multi-terminal capacitor in accordance with the present invention.

DETAILED DESCRIPTION

FIG. 2 illustrates a trimmable multi-terminal capacitor according to the invention implemented within a voltage controlled oscillator (VCO) circuit. VCO circuit 200 comprises multi-terminal capacitor 202 and ceramic resonator 204. Ceramic resonator 204 comprises a central terminal 206 and a casing 208. Capacitor 202 comprises dielectric layer 210, a common conducting plate 212 disposed on the top surface 218 of the dielectric layer 210, and two separate conducting plates 214 and 216 (shown by dotted line) disposed on the bottom surface (not shown) of dielectric layer 210. Multi-terminal capacitor 202 is used to couple resonator 204 to a varactor diode (not shown) and a transistor (not shown) in the VCO circuit 200. To implement the coupling, capacitor 202 is connected to the center terminal 206 of ceramic resonator 204 by connecting terminal 206 to common plate 212, and connecting one of each of the two conducting plates 214 and 216 on the lower surface of dielectric layer 210 to the varactor diode and transistor, respectively.

Referring now to FIGS. 3 and 4, therein are illustrated a top view and a bottom view, respectively, of an embodiment of a trimmable multi-terminal capacitor 202 in accordance with the invention. Capacitor 202 comprises a dielectric layer 210, a common conducting plate 212, and two separate conducting plates 214 and 216. Common conducting plate 212 is disposed on the top surface 218 of dielectric layer 210 (FIG. 3). Conducting plates 214 and 216 are disposed on the bottom surface 220 of dielectric layer 210 so as not to contact each other (FIG. 4). Conducting plates 214 and 216 form two capacitors C1 and C2, respectively, with the portions of conducting plate 212 aligning the area of each of plate 214 and 216. Conducting plate 212 comprises a terminal common to both capacitors. Dielectric layer 210 may comprise any suitable type of dielectric material such as, for example, $Al_2O_3$. Conducting plates 212, 214 and 216 may be any suitable conducting material such as, for example, Ag.

Because dielectric layer 210 may be constructed with an accurate and uniform thickness and the surface area of the conducting plates 212, 214 and 216 may be accurately defined, capacitances C1 and C2 can be constructed with a low design tolerance.

Conducting plate 212 comprises a plurality of tabs, 222, 224 226, 228, 230, 232 and 234, which may be selectively removed in order to tune each of the individual capacitors C1 and C2 to a desired capacitance value. Tabs 222, 224, 226, and 228 are removed to tune the value of C1 and, tabs 230, 232 and 234 are removed to tune the value of C2. Tabs 222, 224, 226 and 228 are each of an equal surface area, that is calculated to allow tuning of C1 by decreasing the value of C1 in equal increments. Tabs 230, 232 and 234 are also each of an equal surface area, that is calculated to allow tuning of C2 by decreasing the value of C2 in equal increments. The tabs may be removed by handtrimming with a cutting tool, for example, or by laser trimming.

For the application shown in FIG. 2, a trimmable multi-terminal capacitor for use at PCS frequencies in the 1800–2000 MHZ range has been manufactured having values for initial capacitances C1 and C2 of 0.6 pF and 0.3 pF, respectively. These values for C1 and C2 may then be trimmed down as far as 0.3 pF and 0.15 pF, respectively, in order to tune the VCO circuit to the correct coupling factors for both the varactor and oscillator transistor.

In the VCO of FIG. 2 it is not necessary to replace C1 and C2 to tune the circuit. It is also not always necessary to tune the resonator by hand scratching. The initial values of C1 and C2 can be set to values larger than necessary, and the circuit resonant frequency can be measured and C1 and C2 trimmed down in value to tune the circuit. The process of measuring and trimming can be repeated until the desired results are reached. It is not necessary to wait for solder to cool down before measuring after changing the capacitance values. The process of tuning the VCO is quick, saves work and allows accuracy in tuning. The multi-terminal capacitor 202 also provides the advantage of being easily packagable in tape and reel. With tape and reel packaging the multi-terminal capacitor could be automatically mounted.

It is believed that the operation and construction of the present invention will be apparent from the foregoing description and, while the invention shown and described herein has been characterized as a particular embodiment, changes and modifications may be made therein without departing from the spirit and scope of the invention as defined in the following claims.

What is claimed is:

1. A multi-terminal capacitor, comprising:
   a dielectric layer having a first and a second surface, said surfaces being substantially parallel in relation to one another;
   a common conductor on said first surface, said common conductor comprising a central terminal of said multi-terminal capacitor, and having a plurality of tabs being selectively removable to tune the capacitance value of said multi terminal capacitor; and
   a plurality of separate conductors on said second surface, wherein said separate conductors and said common conductor are aligned to form a corresponding plurality of capacitors, and each of said separate conductors comprises an outside terminal of said multi-terminal capacitor, the selectively removable tabs removed to tune the capacitance values of the plurality of capacitors.

2. The multi-terminal capacitor of claim 1 in which said common conductor comprises a first terminal, and in which said plurality of separate conductors comprises a second and third conductor, said second and third conductors comprising a second and third terminal, respectively.

3. A voltage controlled oscillator circuit comprising:
   a resonator having an output terminal; and
   a multi-terminal capacitor comprising:
      a dielectric layer having a first and a second surface, said surfaces being substantially parallel in relation to one another;
      a common conductor on said first surface, said common conductor comprising a central terminal of said multi-terminal capacitor, said central terminal being connected to said output terminal of said resonator, and having a plurality of tabs being selectively removable to tune the capacitance value of said multi terminal capacitor; and
      a plurality of separate conductors on said second surface, wherein said separate conductors and said common conductor are aligned to form a corresponding plurality of capacitors, and each of said separate conductors comprises an outside terminal of said multi-terminal capacitor, the selectively removable tabs removed to tune the capacitance values of the plurality of capacitors.

4. The voltage controlled oscillator of claim 3 in which said common conductor comprises a first terminal, and in which said plurality of separate conductors comprise a second and a third conductor and said second and third conductors comprise a second and third terminal, respectively.

5. A voltage controlled oscillator circuit comprising:
   a resonator having an output terminal; and
   a multi-terminal capacitor comprising:
      a dielectric layer having a first and a second surface, said surfaces being substantially parallel in relation to one another;
      a common conductor disposed on said first surface, portions of the common conductor being removable to tune the capacitance of the multi-terminal capacitor, said common conductor comprising a central connection terminal of said multi-terminal capacitor connected to said output terminal of said resonator; and
      two separate conductors disposed on said second surface, wherein said two separate conductors and said common conductor are aligned to form two capacitors, and each of said separate conductors comprising an outside connection terminal of said multi-terminal capacitor.

6. The multi-terminal capacitor of claim 5 wherein the removable portions of the common conductor comprise a plurality of tabs, said tabs being selectively removable to tune the capacitance values of each of said two capacitors.

* * * * *